United States Patent
Lulla

(10) Patent No.: US 8,762,160 B2
(45) Date of Patent: Jun. 24, 2014

(54) PURCHASER VALUE OPTIMIZATION SYSTEM

(75) Inventor: Gautam Lulla, Nice (FR)

(73) Assignee: Amadeus S.A.S., Sophia Antipolis (FR)

( * ) Notice: Subject to any disclaimer, the term of this patent is extended or adjusted under 35 U.S.C. 154(b) by 1724 days.

(21) Appl. No.: 11/086,905

(22) Filed: Mar. 23, 2005

(65) Prior Publication Data

US 2006/0218024 A1   Sep. 28, 2006

(51) Int. Cl.
*G06Q 10/00*   (2012.01)
*G06Q 20/00*   (2012.01)

(52) U.S. Cl.
USPC ............................................. 705/1.1; 705/80

(58) Field of Classification Search
USPC .............. 705/1.1, 14.23, 14.27, 14.28, 14.31, 705/14.32, 14.36, 80; 725/60
See application file for complete search history.

(56) References Cited

U.S. PATENT DOCUMENTS

| | | | |
|---|---|---|---|
| 5,774,870 A | 6/1998 | Storey | |
| 6,009,412 A | 12/1999 | Storey | |
| 6,018,715 A | 1/2000 | Lynch et al. | |
| 6,085,976 A * | 7/2000 | Sehr .............................. | 235/384 |
| 6,477,520 B1 | 11/2002 | Malaviya et al. | |
| 6,571,216 B1 | 5/2003 | Garg et al. | |
| 6,578,012 B1 | 6/2003 | Storey | |
| 2001/0049628 A1 | 12/2001 | Icho | |
| 2001/0054003 A1 | 12/2001 | Chien et al. | |
| 2002/0072968 A1 | 6/2002 | Gorelick et al. | |
| 2002/0188511 A1 | 12/2002 | Johnson et al. | |
| 2003/0023463 A1 * | 1/2003 | Dombroski et al. .............. | 705/5 |
| 2003/0040964 A1 | 2/2003 | Lacek | |
| 2004/0064371 A1 | 4/2004 | Crapo | |
| 2004/0117249 A1 | 6/2004 | Wang et al. | |
| 2004/0238622 A1 | 12/2004 | Freiberg | |
| 2006/0053055 A1 * | 3/2006 | Baggett et al. .................. | 705/14 |
| 2006/0089874 A1 * | 4/2006 | Newman et al. ................ | 705/14 |

FOREIGN PATENT DOCUMENTS

| | | |
|---|---|---|
| CA | 2379148 | 1/2001 |
| CA | 2359088 | 4/2003 |
| WO | WO 01/04823 | 1/2001 |
| WO | WO 01/15048 | 3/2001 |
| WO | WO 01/82106 | 11/2001 |
| WO | WO 02/41556 | 5/2002 |
| WO | WO 03/012600 | 2/2003 |
| WO | WO 2004/019257 | 3/2004 |

* cited by examiner

*Primary Examiner* — Mark A Fleischer
(74) *Attorney, Agent, or Firm* — Wood, Herron & Evans LLP

(57) ABSTRACT

A purchasing system includes a master server linking to a product and service inventory database. A query and response coordination database is hosted on the master server and includes a customer profiles database, a loyalty program rules database, and a purchase rules dataset. The coordination database receives a purchase request query, extracts purchase data elements from the received purchase request query, uses purchase rules from the rules dataset, applying the extracted purchase data elements to form a purchase query, applies the purchase query to the inventory database to determine available product and service inventory that satisfy the purchase request query, available product and service inventory that satisfy the purchase request query being identified as purchase options, receives purchase options from the inventory database, determines a total rewards benefit and creates a file for sending via the network to the purchaser's computer to display the query response.

20 Claims, 3 Drawing Sheets

```
Package     Cost        Rewards Miles

1)
Airline A   $250        500 miles by Airline A
                        250 miles by Airline B
Hotel A     $100        100 miles to Hotel A 2)
Airline B   $255        650 miles by Airline B
Hotel A     $100   100 miles to Hotel A 3)
Airline C   $250        500 miles by Airline C
Hotel A     $90    100 miles to Hotel A 4)
Airline C   $250        950 miles by Airline C
Hotel B     $90    300 miles to Hotel B
```

| Airline | Cost | Rewards Miles |
|---|---|---|
| A | $225 | 500 miles by Airline A |
|   |      | 250 miles by Airline B |
| B | $225 | 650 miles by Airline B |
| C | $250 | 950 miles by Airline C |
| D | $250 | 800 miles by Airline D |
| E | $250 | 0 miles |

Figure 3

Package    Cost    Rewards Miles

1)
Airline A $250    500 miles by Airline A
                  250 miles by Airline B
Hotel A    $100   100 miles to Hotel A 2)
Airline B    $255    650 miles by Airline B
Hotel A   $100   100 miles to Hotel A 3)
Airline C    $250    500 miles by Airline C
Hotel A   $90   100 miles to Hotel A 4)
Airline C    $250    950 miles by Airline C
Hotel B   $90   300 miles to Hotel B

Figure 4

PURCHASER VALUE OPTIMIZATION SYSTEM

BACKGROUND OF THE INVENTION

The invention concerns optimizing purchaser valve when making on-line computer purchases that involve rewards benefits granted through seller loyalty programs. More specifically, the invention concerns a system and method assisting purchasers in making purchase decisions based on the consolidated, simultaneous display of plural purchase options for products and/or services from plural providers, where each purchase option includes a purchase price and a corresponding rewards benefit such as rewards miles. Presentation of consolidated purchase options allows the purchaser to readily compare one purchase option, from a first provider, to the other remaining purchase options from other providers, and thereby the invention puts the purchaser in position to make an optimal purchase decision that optimizes purchaser value.

In application to travel purchases, the invention responds to a traveler's travel request by simultaneously displaying plural travel options that satisfy a travel request, and for each displayed travel option, the invention displays both a purchase cost and resulting total rewards miles that accrues to the traveler upon purchase of that travel option. By simultaneously presenting both cost and total rewards miles for each travel option from the competing providers, the traveler can promptly make an optimal purchase decision since the traveler can compare, on an "apples to apples" basis, the cost and rewards benefit of each travel option against to the cost and rewards benefits of the remaining travel options. In this way, the traveler can determine the best value as the traveler can readily decide which travel option has the best net cost (where, for instance, net cost=purchase cost−awarded miles) and thereby optimize purchaser value.

DESCRIPTION OF THE RELATED ART

On-line computer purchasing has become commonplace with the explosion of the Internet. Yet, that same Internet explosion has made on-line purchasing very difficult when searching for a best deal, since an Internet purchase query returns so many responses that the user has information overload. Put another way, when a user asks the Internet about purchasing a specific item in order to compare value from competing providers, there are often too many responses concerning alternative purchase options and the user therefore becomes overwhelmed and unable to readily determine the best purchaser value.

In the area of travel purchasing, computerized travel reservation systems were originally designed for use by professional travel agents and call center agents. These systems helped optimize sales for travel agents and call center agents. Recent Internet prior art systems that allow travelers themselves to book travel, are an outgrowth of these professional travel agent systems and therefore retain much of the prior art focus of having been developed for the travel sales professional.

From a technical viewpoint, these prior art reservation systems contain databases or are connected to other systems containing the necessary databases. These databases store inventory, availability, and prices. Utilizing these databases, a traveler can check for availability and prices in order to make a travel reservation.

The travel databases can be personalized for individual travelers. There are on-line travel systems that take advantage of various databases with user profiles, awards information and programs, and automated travel booking. However, these prior art systems are disparate in nature and fail to provide the comparative information necessary for making optimal purchase decisions. For example, the British Airways Executive Club website shows rewards in different formats for different hotel choices. For a first hotel the rewards is shown as miles awarded per stay whereas for a second hotel the rewards is shown as miles awarded per U.S. dollar spent. Neither shows a specific room reservation for a specific cost and a specific total rewards miles for making that reservation. Thus, the traveler is not in a position to readily make a direct comparison between hotel alternatives.

LYNCH et al. U.S. Pat. No. 6,018,715 discloses an automated travel planning system utilizing a traveler portfolio database containing information that is used to determine an individual customer's preferred travel plan in response to any itinerary submitted by that individual. The traveler portfolio information may include, for example, the name and address of each individual customer of the travel agency, the air carriers, automobile rental agencies, or hotels preferred by each individual, frequent flier or renter programs in which the individual participates, and the seating and/or smoking preferences for each individual.

LYNCH et al. discloses a system that, under the control of a decision engine module, queries the user to input whether the information in the traveler portfolio should be considered in the process of determining a recommended travel plan. If so, the system automatically retrieves the traveler portfolio information from the traveler portfolio residing in a database. The traveler portfolio information can include the air carriers, automobile rental agencies, or hotels preferred by the traveler, frequent flier or renter programs in which the traveler participates, and the traveler's seating and/or smoking preferences.

LYNCH et al. seeks to provide an optimized solution to the user's travel request, based on previously stored user preferences. This approach, however, fails to present the user with consolidated travel solutions that show both cost and rewards benefits. Therefore, the user is not in a position to readily make an optimal purchase decision between the travel alternatives offered by plural airlines.

Loyalty rewards programs are also known where making a purchase results in the purchasers receiving a loyalty reward, e.g., receiving airline miles for purchasing an airline flight. In loyalty rewards programs, there is an emphasis on loyalty program affiliation between sellers and affiliation levels and benefits. Several travel service providers have mutual affiliations in order to mutually promote sales of the affiliated providers' products and services.

It is known in the prior art to show rewards benefits for a given purchase and to convey this information to an on-line user. For example, STEINBERG WO 03 012600 discloses that a user can make on-line inquiries to determine available incentive programs. Individual airlines, such as Quantas, have frequent flyer programs that display a travel solution with rewards miles information for its flights.

But the individual airlines have shown no interest in making available "apples to apples" comparison information available to the user in a manner sufficient to let the user optimize the travel purchase. For example, in the case of the Quantas Frequent Flyer system, there is displayed to the user a number of rewards points per dollar cost of the flight purchase. Calculation of the total rewards points for each purchase options, and comparison to other carrier's flight purchase options, is left to the travel user.

In the Quantas Frequent Flyer system, for hotels, a points per dollar spent format is also used. For each hotel there is indicated how many points will be rewards for each dollar spent. However, there is no display of a specific room reservation for a specific cost and a specific total rewards miles for making that reservation. Indeed, the web page showing rewards miles does not indicate the availability of the hotels. Thus, the traveler is again not in a position to readily make a direct comparison between hotel alternatives as to actual costs and rewards that will accrue.

The prior art also directs specific rewards programs to specific users based on user profiles. For instance, GARG et al. U.S. Pat. No. 6,571,216 discloses a system that tailors the rewards offer to a user based on that user's profile.

Such prior art programs are directed at optimizing results for the sellers by promoting offers optimized for the seller's products and programs rather than focusing on presenting the user with information so that the user can make an optimal purchase decision. Because of the bias of the prior art systems, the traveler is not able to readily determine which travel option is the best value.

Similar issues exist in the on-line purchase of non-travel goods and services.

SUMMARY OF THE INVENTION

The invention shifts the focus of the on-line purchase process from the prior art query and response model optimizing seller sales to a new query and response model optimizing purchaser value. The invention applies to both travel and non-travel purchases.

The invention provides a system and method to assist users make "best for the purchaser" decisions based on the consolidated, simultaneous display of plural purchase options from plural providers, e.g., of plural purchase prices and a corresponding total rewards benefit. For airline flight reservations, the invention would consolidate available fares from plural airlines and simultaneously display the flight information, the seat cost, and the total airline rewards miles awarded for each seat. Presentation of consolidated travel options allows the user can readily compare one travel solution to the other travel solutions and thus make an optimal purchase decision that optimizes purchaser value.

In general, the invention displays rewards earned by product or service being purchased or booked, consolidating the offers from plural providers. Also, there is displayed plural products or services (from multiple loyalty programs) and the rewards for each product or service. In this way, multiple loyalty programs can be evaluated on a single screen.

In one embodiment, an on-line travel services purchaser (user) makes an airline travel request query. In response to the purchaser's query, there are displayed plural travel solutions that satisfy the travel request. The plural travel solutions include products (services) from plural loyalty programs on a single screen. For each travel solution, there is also displayed both a purchase cost and resulting rewards miles that accrues to the purchaser upon purchase of that travel solution option.

In another embodiment, there are displayed costs and rewards benefits for a plurality of purchase options such that a purchaser can make an "apples to apples" comparison. The invention allows a purchaser to compare the cost and rewards benefit of each purchase option against to the cost and rewards benefits of the other purchase options. The user thus can readily determine the best value.

The invention provides a system and method that allows a purchaser to evaluate alternative purchase options in a multi-variable setting that includes both costs and rewards benefits so as to come to an optimal purchase decision. Purchasers using the invention can make net cost evaluations where the net cost discounts the apparent purchase cost by the value of the corresponding rewards benefits, e.g., award miles.

The invention advances an important criteria for the traveler purchasers; that is, offering traveler purchasers who have loyalty program affiliation an effective means of optimizing their travel purchases.

The invention includes applications to (but is not limited to these examples):
Online users of hotel/hotel brand or chain websites;
Hotel/hotel chain call center users (e.g., call center agents for a specific hotel chain);
Online travel agency websites;
Offline travel agents;
Airline websites; and
Airline call centers (e.g., call center agents for a specific airline).

BRIEF DESCRIPTION OF THE DRAWINGS

FIG. 3 illustrates the display of a consolidated travel query response on a purchaser's computer monitor.

FIG. 4 illustrates the consolidated display of travel packages.

DESCRIPTION OF THE PREFERRED EMBODIMENTS

Figure 1:
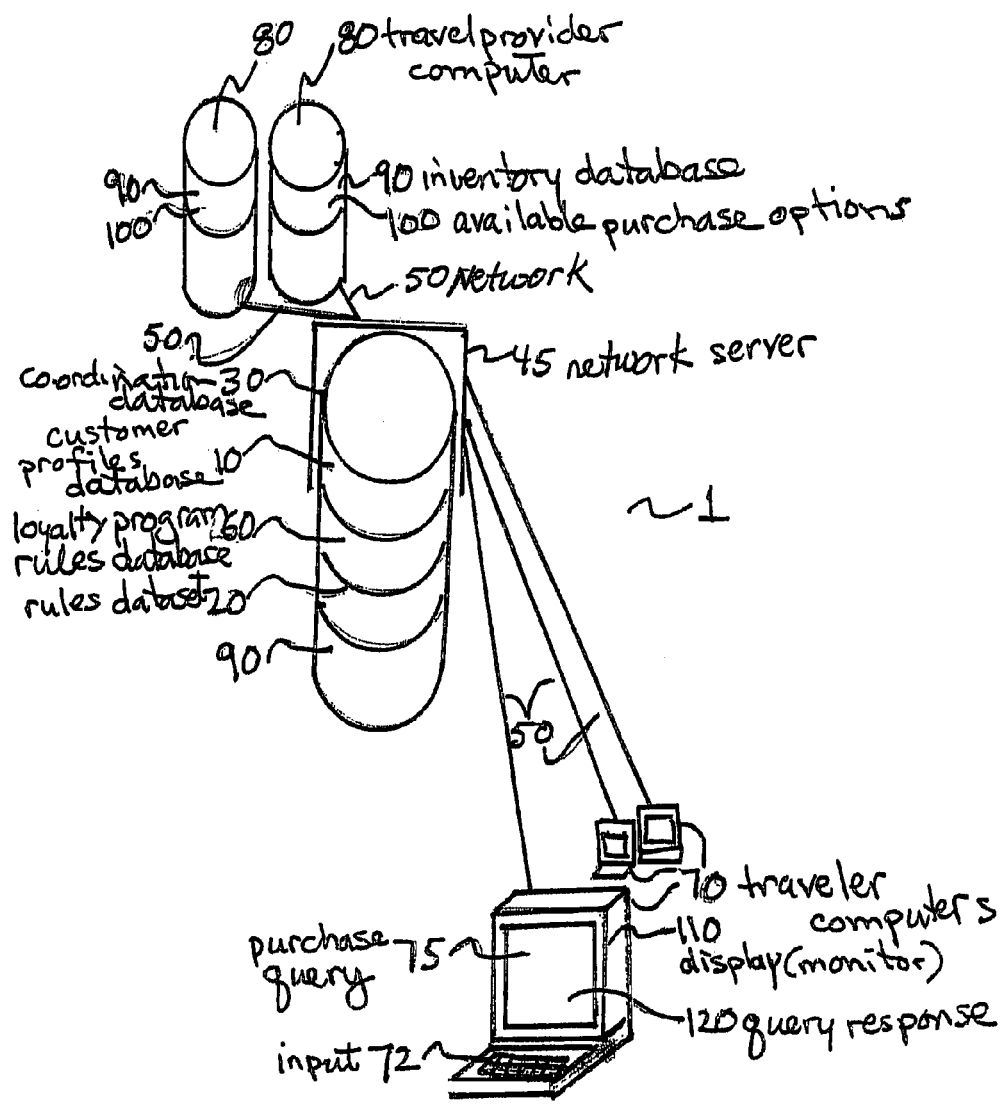
FIG. 1 illustrates one system embodiment of the invention directed to travel services.

FIG. 1 illustrates one system embodiment of the invention oriented to purchasing travel services.

On-line sales involve sellers (travel service providers) and purchasers (travelers). Travel purchasers make travel requests. In the invention, available products and services that satisfy the travel service request are found, and rewards benefits that accrue upon purchase, to the specific traveler, are determined.

The illustrated embodiment utilizes a request query and response coordination database 30 to connect information concerning travel goods and services with travel purchasers.

The coordination database 30 includes rules implementing computer methodology for finding travel products and services that satisfy the traveler's needs as specified in the travel request. These computer rules are maintained a rules dataset 20. Customer profiles are assembled into a customer profiles database 10 in the coordination database 30. The coordination database 30 also includes a loyalty program rules database 60. The loyalty program rules database maintains each of plural sellers' sales programs and their loyalty program rules.

The coordination database 30 may be consolidated on a single network server 45, or may be distributed over plural computers connected via a network 50. The travel server 45 is connected to the network 50 and, via the network, links plural travel provider computers 80 to plural traveler computers 70 to form a many-to-many system.

In this embodiment of the invention, on-line sales also involve seller inventory recorded on seller inventory databases 90, e.g. travel inventory recorded on travel inventory databases 90. The seller inventory represents available possible available purchase options 100 for offer by sellers to purchasers.

In response to a purchase query 75 made by user purchaser through an input 72, the coordination database 30 extracts relevant data elements from the purchase query 75. The data elements serve as selection factors to find items from the available sellers' inventory, as recorded on seller inventory databases 90, to offer for sale to the purchaser. For example, in the case of a travel query, the travel query data elements, together with rules from the rules dataset 20, drive the coordination database 30 to find available seats (purchase options) on airline flights that satisfy the travel requirements of the travel query.

Additionally, the data elements and the satisfying purchase options available from the sellers' inventory serve as selection factors for querying against the loyalty program rules database 60 for each of plural sellers' sales programs taking into account the individual purchaser's profile 10 or information input directly from the purchaser as well as the rules dataset 20.

The coordination database 30 thus determines plural available purchase solutions that satisfy the purchaser's purchase query and the total rewards benefits that would be granted by each seller to the purchaser for each of the purchase solutions. The available purchase solutions are purchase options that may be presented to the purchaser. These purchase options, from plural sellers, are consolidated into a common presentation for simultaneous display to user purchaser by sending an appropriate query response 120, in the form of a file, over the network 50 for display on the purchaser's computer 70. The file normally causes a web page to be displayed on the purchaser's computer. The file may comprise an email, an email attachment, and/or a downloadable file for printing.

The purchase options are simultaneously displayed on the purchaser's (traveler's) computer 70. The simultaneous display includes details of each seller item (airline travel seat), the item's cost (seat's cost), and the total rewards benefit (total rewards miles) that accrue upon purchase of each seller item. Each information relating to each displayed component is in the same format, e.g., total miles for purchase of a airline seat or total miles for reserving a hotel room, in order to provide direct comparison between displayed alternatives. Note, in the invention, it is available product that is displayed and the total miles that accrue for the available product at the indicated cost and based on the purchaser's loyalty program membership and membership level or tier.

Thus, the invention will display different results for different purchasers who have different loyalty memberships and/or different membership tiers.

Where rewards miles accrue to more than one loyalty program, the invention will display the rewards miles for each loyalty program. For example, booking a hotel room might award the purchaser with miles to both an airline loyalty program and to a hotel loyalty program.

The computer monitor display 110 presents the query response 120 to the purchaser showing the consolidation of the purchase options, cost, and total rewards benefit in consistent manner so that the purchaser can determine which purchase option is optimal and thereby assist the purchaser optimize the purchase value.

For example, as shown in FIG. 3, in response to a traveler's booking request query for an airline ticket from location A to location B, the purchaser's computer monitor displays the query response 120. Also see table 1.

From the query response 120, the travel purchaser can readily determine which purchase option is optimal for that travel purchaser. For example, it may be that Airline C's offer of 950 miles is optimal for the travel purchaser even though the ticket cost of $250 is more than the ticket costs for Airlines A and B. Note that where the traveler does not have a loyalty membership with an airline, e.g., Airline E, there is no rewards miles shown, even if some rewards miles would accrue had the traveler had a loyalty membership with this airline. Also note that, where rewards accrue to more than one loyalty program, the total miles accruing to each loyalty program is displayed. See that for the seat on Airline A, there accrues 500 miles to the Airline A program and 250 miles to the Airline B program.

The system also provides that the query response 120 may also be printed out as a hard copy result table, received by the purchaser as an email, an email attachment, or other known downloadable file type. The hard copy table is represented by Table 1 below.

TABLE 1

(Query Response 120)

| Airline | Cost | Rewards Miles |
|---------|------|---------------|
| A | $225 | 500 miles by Airline A |
|   |      | 250 miles by Airline B |
| B | $225 | 650 miles by Airline B |
| C | $250 | 950 miles by Airline C |
| D | $250 | 800 miles by Airline D |
| E | $250 | 0 miles |

Implementation of the inventive system is explained more fully below.

A traveler inputs a travel request query 75, e.g., an airline flight query using an input 72 of the traveler's computer 70. The travel request query 75 is sent via the network 50 to the coordination database 30. In response to the received travel query 75, the coordination database 30 collects, either directly from the traveler or from the traveler's profile found in the customer profiles database 10, at least a minimum required amount of information about the traveler's loyalty program(s) membership(s).

The system extracts relevant flight data elements from the airline flight query in order to search the airline (sellers) inventory in order to develop travel options for each airline. The search is done by checking the travel inventory database 90 for available inventory that satisfies the search query as expressed by the extracted flight data elements. The relevant flight data elements serve as selection factors to find available seats on flights from the airlines' inventory. These available seats are travel purchase options 100 and may be offered the traveler.

Information on the traveler's loyalty program(s) membership(s) is matched with each purchase option 100 and that airline's loyalty program rules database 60 in order to determine the total rewards miles that will accrue for that purchase option (seat purchase). The system may also search for special promotional or membership benefits offered by each airline having available seats that meet the travel query and adjust the total rewards miles accordingly. For instance, if Airlines A and B are commonly owned and the common owner wants to promote Airline A, a promotion might be to offer rewards miles to the loyalty programs of both Airline A and Airline B. As an example, see FIG. 3, the $225 seat to Airline A.

In determining the rewards miles, the airline's loyalty program rules database 60 may provide different miles depending on the traveler's membership level or tier. That is, for the same seat, there may be awarded 500 miles for a basic level member, 750 miles for an executive level member, and no miles for a government level member.

The coordination database 30 thus determines plural purchase solutions (available airline seats) that satisfy the traveler's travel query and the total rewards benefits that would be granted by each airline for each seat purchase based on the traveler's loyalty program membership(s) as input directly or extracted from the customer profiles database 10. These purchase solutions are presented, via a file sent over the network, as flight seat options to the traveler presented by the query response 120. The seat options are displayed as a seat options on the monitor 110 of the traveler's computer 70. There is simultaneously shown (See FIG. 3) details of each available airline seat including cost and the total rewards miles that accrue with purchase of each seat.

Since the traveler is presented with the travel options in a consistent manner, the purchaser can readily compare costs and rewards, and thereby optimize the purchase value when making the seat purchase.

The invention also includes embodiments for use in making hotel reservations. For example, consider a traveler with both Air France and Qantas frequent flyer program memberships, looking for a hotel in Paris for 3 nights from September $1^{st}$ through September $4^{th}$. The system returns, as purchase options, available rooms together with rewards miles earned under each of the Air France and Qantas frequent flyer programs. The purchase options may be sorted by number of miles earned as shown in Table 2 below.

TABLE 2

| Hotel | Cost | Rewards Miles |
|-------|------|---------------|
| A | $225 | 500 miles Air France |
|   |      | 550 miles Qantas |
| A | $250 | 650 miles Air France |
|   |      | 900 miles Qantas |
| B | $250 | 950 miles Air France |
|   |      | 500 miles Qantas |
| B | $260 | 950 miles Air France |
|   |      | 900 miles Qantas |

Note that at the same hotel, a slightly higher cost room may provide a significantly greater rewards benefit. Also, awarded miles can also vary as a function of various criteria including affiliate travel partner service provider, time bound special offers, products offered by the travel service provider, and membership levels.

Another embodiment provides for the consolidated display of travel packages, as illustrated by FIG. 4.

In the embodiment illustrated by FIG. 4, there is displayed a query response 120 that consolidates four travel packages showing combinations of three airlines and two hotels. In package 1, purchase of Airline A with hotel A accrues miles to the loyalty programs of Airline A, Airline B, and Hotel A. In package 2, miles accrue to loyalty programs of Airline B and Hotel A. In package 3, miles accrue to loyalty programs of Airline C and Hotel A. In package 4, miles accrue to loyalty programs of Airline C and Hotel B. Note that, when comparing packages 3 and 4, selecting Hotel B results in greater miles accruing to the loyalty program of Airline C.

Figure 2:
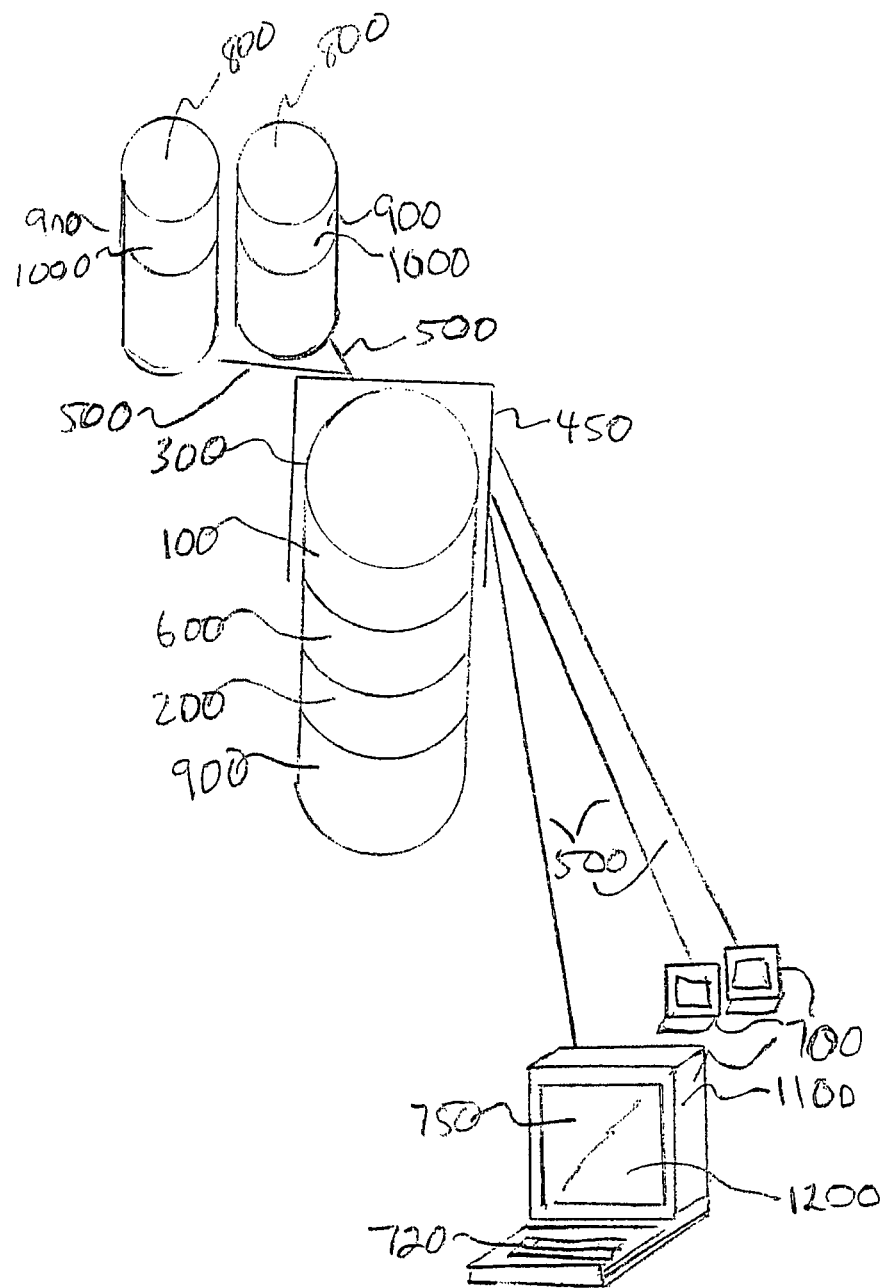
FIG. 2 illustrates one system embodiment of the invention directed to a general on-line service and product system.

The invention is not limited to only travel purchasing. The invention includes embodiments for generalized on-line purchase query and response systems. FIG. 2 illustrates one system embodiment of the invention directed to a general on-line service and product system.

This embodiment includes a master server 450 connected to a computer network 500. The master server 450, via the network 500, links product and service inventory databases 900 to plural consumer computers 700. The master server 450 acts as a hub and establishes a many-to-many system.

The product and service inventory databases 900 store product and service inventory available as consumer purchase options 1000.

A query and response coordination database 300 is hosted on the master server 450. The coordination database 300 comprises a customer profiles database 100, a loyalty program rules database 600, a purchase rules dataset 200, and optionally an inventory database 900. As shown, the inventory databases 900 may also be on seller computers 800.

The coordination database 300 is configured to coordinate plural operations. A first operation is receiving a purchase request query 750 generated by a purchaser on one of the purchaser computers 700 using input 720. Purchase data elements are extracted from the received purchase request query 750 to set up a query against the inventory databases 900.

A second operation is, using purchase rules from the rules dataset 200, applying the extracted data elements to form a purchase query. The purchase query is applied to the inventory databases 900.

A third operation is receiving purchase options 1000 from each inventory database 900, the purchase options being generated responsive to the sent purchase query 750. The received purchase options representing available inventory that can be offered to the purchaser.

A fourth operation is applying the purchase options to rules found in the loyalty program rules database to determine a total rewards benefit accruing to the purchaser for each available purchase option. In this way, the purchaser will know what products and services are available for purchase and what the total rewards benefit is for each alternative.

A fifth operation is creating a file to be sent via the network to the purchaser's computer to display the query response 1200 on monitor 1100, where the display simultaneously shows each purchase option together with the determined total rewards benefit for each purchase option. The file provides a consolidated, simultaneous display of the plural purchase options, where each displayed purchase option includes a purchase price and the corresponding total rewards benefit, the simultaneous display allowing the user to readily compare one purchase option to other remaining purchase options to make an optimal purchase decision based on net cost to optimize purchaser value to the user.

As with other embodiment, the simultaneous display may comprise rewards benefits from plural loyalty programs.

The invention claimed is:

1. A system for use with a plurality of travel provider computers connected to a computer network, each travel provider computer hosting a travel inventory database configured to store travel inventory available as alternative travel purchase options for a travel provider, the system comprising:
   a traveler computer connected to the computer network, the traveler computer comprising an input configured to originate a travel request query and a display configured to display a query response comprising one or more of the alternative travel purchase options;
   a travel server connected to the computer network and, via the computer network, linking the travel provider computers to the traveler computer; and
   a coordination database hosted on the travel server, the coordination database comprising a loyalty program rules database and a rules dataset,
   wherein the travel server comprises:
   i) a first unit configured to receive the travel request query input by a traveler at the traveler computer and to extract travel data elements from the travel request query;
   ii) a second unit configured to use rules from the rules dataset to form a travel query from the travel data elements and to send the travel query to the travel provider computers to query the travel inventory database of each of the travel provider computers;

iii) a third unit configured to receive a plurality of the alternative travel purchase options from the travel inventory database of each of the travel provider computers generated responsive to the travel query, the plurality of the alternative travel purchase options representing available travel inventory satisfying the travel request query;

iv) a fourth unit configured to apply loyalty program rules from the loyalty program rules database for each travel provider to determine a total rewards miles accruing to the traveler for each of the plurality of the alternative travel purchase options; and v) a fifth unit configured to create a file for display on the display of the traveler computer, the file including a consolidated query response comprised of the plurality of the alternative travel purchase options from the travel providers, the total rewards miles that accrue upon purchase of each alternative travel purchase option, and a purchase cost for each alternative travel purchase option.

2. The system of claim 1, wherein at least one of the travel inventory databases is hosted on the travel server.

3. The system of claim 1, wherein the first unit is further configured to receive information concerning the traveler from a customer profiles database and the fourth unit is further configured to determine the total rewards miles accruing to the user for each alternative travel purchase option based at least in part on the traveler information.

4. The system of claim 3, wherein the traveler information comprises loyalty program membership for each travel provider.

5. The system of claim 4, wherein the loyalty program membership information comprises membership level information.

6. The system of claim 1, wherein the first unit is further configured to receive traveler information input by the traveler at the traveler computer as part of the travel request query, and the fourth unit is further configured to determine the total rewards miles accruing to the user for each alternative travel purchase option based at least in part on the traveler information.

7. The system of claim 6, wherein the traveler information comprises loyalty program membership information for each travel provider.

8. The system of claim 1, wherein the fourth unit is further configured to receive a travel promotion that increases the total rewards miles accruing to the user for at least one of the alternative travel purchase options.

9. The system of claim 1, wherein the file is suitable for printing as a hard copy report.

10. A system for use with travel inventory databases of a plurality of travel provider computers connected to a computer network, each travel inventory database configured to store travel inventory available as alternative travel purchase options for a travel provider, the system comprising:

a travel server connected to the computer network and, via the computer network, linking the travel inventory databases of the travel provider computers to a plurality of traveler computers; and a coordination database hosted on the travel server, the coordination database comprising a loyalty program rules database and a rules dataset, wherein the travel server comprises:

i) a first unit configured to receive a travel request query from input by a traveler at one of the traveler computers and to extract travel data elements from the travel request query;

ii) a second unit configured to apply rules from the rules dataset to form a travel query from the data elements and to send the travel query to the travel provider computers to query the travel inventory database of each travel provider computer;

iii) a third unit configured to receive a plurality of alternative travel purchase options from the travel inventory database of each travel provider computer generated responsive to the travel query, the plurality of the alternative travel purchase options representing available travel inventory satisfying the travel request query;

iv) a fourth unit configured to apply loyalty program rules from the loyalty program rules database for each travel service provider to determine a total rewards benefit accruing to the traveler for each of the plurality of alternative travel purchase options; and v) a fifth unit configured to create a file for display on the traveler computer, the file including a consolidated query response comprised of the plurality of alternative travel purchase options from the travel providers, the total rewards miles that accrue upon purchase of each alternative travel purchase option, and a purchase cost for each alternative travel purchase option.

11. The system of claim 10, wherein the first unit is further configured to receive information concerning the traveler from a customer profiles database and the fourth unit is further configured to determine the total rewards miles accruing to the user for each alternative travel purchase option based at least in part on the user information.

12. The system of claim 10, wherein the first unit is further configured to use traveler information input by the traveler at the traveler computer as part of the travel request query, and the fourth module is further configured to determine the total rewards miles accruing to the traveler for each alternative travel purchase option based at least in part on the traveler information.

13. A method for use with a plurality of travel provider computers connected to a computer network, each travel provider computer hosting a travel inventory database, each travel inventory database configured to store travel inventory available as alternative travel options for a travel provider, the method comprising:

receiving at a coordination database programmed on a travel server connected to the computer network, a travel request query from one of a plurality of traveler computers connected to the computer network, each traveler computer comprising an input device for receiving the travel request query and a display for displaying a query response, the coordination database comprising a loyalty program rules database and a rules dataset;

extracting travel data elements from the travel request query;

applying the extracted data elements to form a travel query;

sending the travel query to the travel provider computers to query the travel inventory database of each travel provider computer;

receiving a plurality of alternative travel purchase options from each travel inventory database of each travel provider computer generated responsive to the travel query, the plurality of alternative travel purchase options representing available travel inventory satisfying the travel request query;

applying loyalty program rules from the loyalty program rules database for each travel provider to determine a total rewards miles accruing to the user for each of the plurality of alternative travel purchase options; and creating a file for display on the display of the traveler computer, the file including a consolidated query response comprised of the plurality of alternative travel purchase options from the travel providers, the total rewards miles that accrue upon purchase of each alternative travel purchase option, and a purchase cost for each alternative travel purchase option.

14. The method of claim 13, wherein at least one of the travel inventory databases is hosted on the travel server.

15. The method of claim 13, further comprising:
receiving information concerning the traveler from a customer profiles database and determining the total rewards miles accruing to the user for each alternative travel purchase option based at least in part on the traveler information.

16. The method of claim 15, wherein the traveler information comprises loyalty program membership for each travel provider.

17. The method of claim 16, wherein the loyalty program membership information comprises membership level information.

18. The method of claim 13, further comprising:
receiving traveler information input by the traveler at the traveler computer as part of the travel request query and determining the total rewards miles accruing to the user for each alternative travel purchase option based at least in part on the traveler information.

19. The method of claim 18, wherein the traveler information comprises loyalty program membership information for each travel provider.

20. The method of claim 13, further comprising:
receiving a travel promotion that increases the total rewards miles accruing to the user for at least one of the alternative travel purchase options.

\* \* \* \* \*